US012588120B2

(12) United States Patent
Mitchell

(10) Patent No.: US 12,588,120 B2
(45) Date of Patent: Mar. 24, 2026

(54) METHOD AND SYSTEM OF ACTIVE COLOR CANCELLATION IN TRANSITION ZONES OF MULTI-COLOR LIGHTING SYSTEMS

(71) Applicant: GM GLOBAL TECHNOLOGY OPERATIONS LLC, Detroit, MI (US)

(72) Inventor: Joseph Mitchell, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 156 days.

(21) Appl. No.: 18/741,426

(22) Filed: Jun. 12, 2024

(65) Prior Publication Data

US 2025/0386404 A1      Dec. 18, 2025

(51) Int. Cl.
| | |
|---|---|
| *H05B 45/20* | (2020.01) |
| *B60Q 3/62* | (2017.01) |
| *B60Q 3/85* | (2017.01) |
| *H05B 47/155* | (2020.01) |

(52) U.S. Cl.
CPC .............. *H05B 45/20* (2020.01); *B60Q 3/62* (2017.02); *B60Q 3/85* (2017.02); *H05B 47/155* (2020.01)

(58) Field of Classification Search
None
See application file for complete search history.

(56) References Cited

U.S. PATENT DOCUMENTS

| | | | |
|---|---|---|---|
| 8,096,675 B1 | 1/2012 | Posselt | |
| 2011/0234121 A1* | 9/2011 | Ding | H05B 45/22 |
| | | | 385/36 |
| 2012/0242227 A1* | 9/2012 | Miller | B60Q 3/80 |
| | | | 315/312 |
| 2012/0286699 A1 | 11/2012 | Yan et al. | |
| 2019/0159316 A1 | 5/2019 | Pfeffr et al. | |
| 2019/0308552 A1* | 10/2019 | Dominick | B60Q 3/85 |

FOREIGN PATENT DOCUMENTS

DE        102012203206 A1      9/2012

* cited by examiner

*Primary Examiner* — Anh Q Tran
(74) *Attorney, Agent, or Firm* — Ingrassia Fisher & Lorenz, LLP | IF&L

(57)        ABSTRACT

A method includes receiving data indicating at least two different base colors to be respectively emitted from base lights on opposite sides of at least one transition light of a light array. Each light of the light array has adjustable colors and is covered by one or more light guides, and receiving data of a target color between the two base colors in at least one coordinate dimension on a chromaticity color space chart. The method also includes determining at least one adjustment color on an opposite side of the target color from a mixed color on the color space chart, and providing the at least one adjustment color to be emitted from the at least one transition light when the base colors are being respectively and simultaneously emitted from the base lights on opposite sides of the at least one transition light.

20 Claims, 7 Drawing Sheets

300

400

550

METHOD AND SYSTEM OF ACTIVE COLOR CANCELLATION IN TRANSITION ZONES OF MULTI-COLOR LIGHTING SYSTEMS

INTRODUCTION

The technical field generally relates to lighting systems for vehicles and, more specifically, to vehicle lighting systems simultaneously emitting light in multiple colors.

Some modern vehicles have functional and/or decorative lights such as LED light strips that can simultaneously emit multiple light colors so that the colors are viewed adjacent to each other along the light strip in a color pattern or rainbow type of display. The lights can be adjusted to emit specific desired colors. It may be desirable to provide additional control of the colors provided by vehicle lighting systems.

Accordingly, it is desirable to provide a lighting system that manages unintentional mixed colors between desired colors. Furthermore, other desirable features and characteristics of the present disclosure will become apparent from the subsequent detailed description and the appended claims, taken in conjunction with the accompanying drawings and the foregoing introduction.

SUMMARY

In an example implementation, a method includes receiving data indicating at least two different base colors to be respectively emitted from base lights on opposite sides of at least one transition light of a light array. Each light of the light array has adjustable colors and is covered by one or more light guides. The method also includes receiving data of a target color between the two base colors in at least one coordinate dimension on a chromaticity color space chart. The two base colors have an undesired mixed color on a linear line between the two base colors on the color space chart. The method includes determining, by at least one processor, at least one adjustment color on an opposite side of the target color from the mixed color on the color space chart. The method also includes providing the at least one adjustment color to be emitted from the at least one transition light when the base colors are being respectively and simultaneously emitted from the base lights on opposite sides of the at least one transition light.

Also in accordance with another example implementation, the lights of the light array are arranged in a linear array or a matrix array, and individual lights of the light array are each color-adjustable LED packages with three diodes of three different colors.

Also in accordance with another example implementation, the method includes selecting the adjustable color so that emitting the adjustable color results in a transition zone between the two base colors with at least one perceivable transition color on opposite sides of the target color visible between the transition colors.

Also in accordance with another example implementation, the target color is white.

Also in accordance with another example implementation, the target color is selected so that the transition colors have less saturation than the base colors.

Also in accordance with another example implementation, the transition colors include a first transition color and a second transition color each respectively closer in hue to the first and second base colors and the target color than a difference in hue between each of the base colors and the mixed color.

Also in accordance with another example implementation, the determining of the adjustment color includes selecting a color value of the adjustment color that is substantially on a same linear line from the mixed color to the target color.

Also in accordance with another example implementation, the determining of the adjustment color includes selecting a color value of the adjustment color that is substantially an equal and opposite distance from the target color than the mixed color.

Also in accordance with another example implementation, the determining of the adjustment color includes setting the target color along a line from the mixed color to the adjustment color.

Also in accordance with another example implementation, the target color is set to be at the midpoint of the line from the mixed color to the adjustment color.

In another example implementation, a lighting system includes an array of lights under at least one light guide and wherein each light has an adjustable color. A light control is communicatively coupled to the array to control the color of the lights. Processor circuitry forms at least one processor communicatively coupled to the array and arranged to operate the light control by receiving data indicating at least two different base colors to be respectively emitted from base lights on opposite sides of at least one transition light of the light array, and receiving data of a target color between the two base colors in at least one coordinate dimension on a chromaticity color space chart. The two base colors have an undesired mixed color on a line between the two base colors on the color space chart, determining at least one adjustment color on an opposite side of the target color from the mixed color on the color space chart. The processor provides the at least one adjustment color to be emitted from the at least one transition light when the base colors are being respectively and simultaneously emitted from the base lights on opposite sides of the at least one transition light.

Also in accordance with another example implementation, the determining of the at least one adjustment color includes determining a distance and direction between the mixed color and the target color, and doubling the distance in the same direction.

Also in accordance with another example implementation, the adjustment color is more saturated than the target color.

Also in accordance with another example implementation, the light array is a two dimensional matrix of lights having multiple transition zones each with a target color and an adjustment color.

Also in accordance with another example implementation, the adjustment color is selected so that the light array emits transition colors having a hue closer to one of the base colors than a difference in hue between the mixed color and one of the base colors.

In another example implementation, a vehicle includes a body and an array of lights under a light guide. Individual lights of the array each have an adjustable color. The vehicle also has memory and processor circuitry forming at least one processor communicatively coupled to the memory and the array. The processor operates to receive data indicating at least two different base colors to be respectively emitted from base lights on opposite sides of at least one transition light of the light array, and receiving data of a target color between the two base colors in at least one coordinate dimension on a chromaticity color space chart. The two base colors have an undesired mixed color on a line between the two base colors on the color space chart. The processor also is arranged to operate by determining at least one adjustment color on an opposite side of the target color from the mixed color on the color space chart, and providing the at least one adjustment color to be emitted from the at least one transition light when the base colors are being respectively and simultaneously emitted from the base lights on opposite sides of the at least one transition light.

Also in accordance with another example implementation, the adjustment color is emitted by more than one transition light on the array.

Also in accordance with another example implementation, emitting the adjustment color at the at least one transition light results in emitting at least two transition colors and the target color between the two transition colors.

Also in accordance with another example implementation, determining of the adjustment color includes determining multiple adjustment colors each to cause a different transition color than the other adjustment colors.

Also in accordance with another example implementation, the light array is mounted on a dashboard, interior side of one or more vehicle doors, steering wheel, instrument panel, center console, vehicle ceiling, or any single one or combination of these.

BRIEF DESCRIPTION OF THE DRAWINGS

The present disclosure will hereinafter be described in conjunction with the following figures. The figures are not to scale and numerals in the figures denote like elements, and where.

DETAILED DESCRIPTION

The following detailed description merely presents example implementations and is not intended to limit the disclosure or the application and uses thereof. Furthermore, no intention exists to be bound by any theory presented in the preceding introduction, summary, or the following detailed description.

Figure 1:
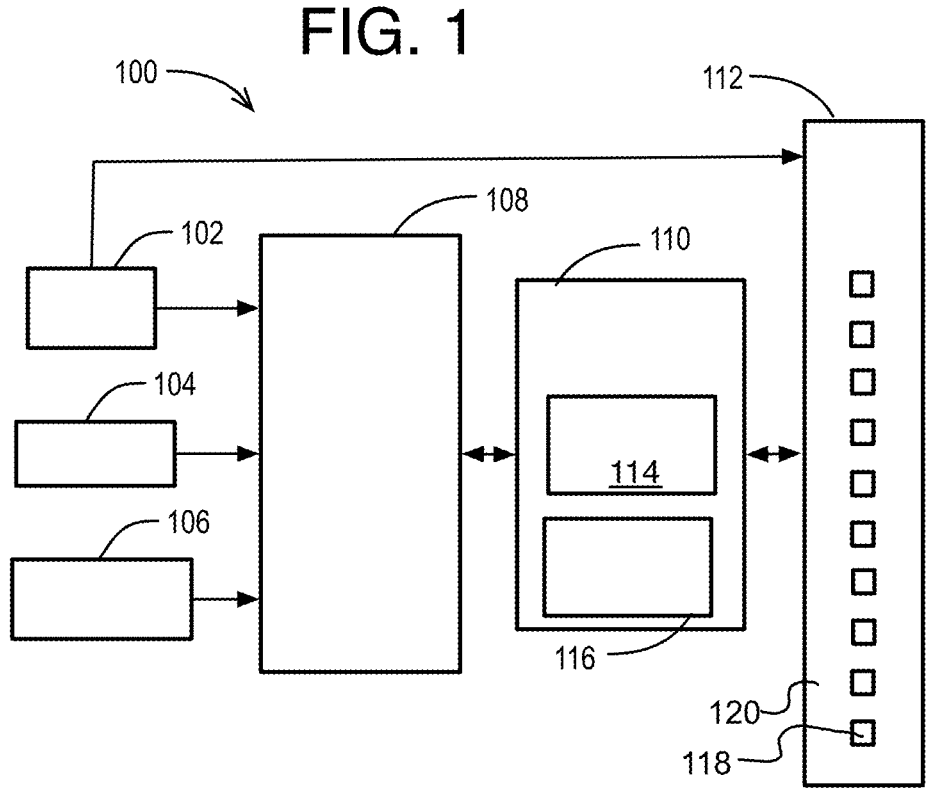
FIG. 1 is a schematic diagram of a lighting system of a vehicle according to at least one of the implementations herein.

Referring to FIG. 1, and in various implementations, a lighting system 100 or device has a power source 102, a memory 104, an interface (or user interface) 106, processor circuitry that forms one or more processors 108, a light control unit (or just light control) 110 communicatively coupled to at least one light array 112 with a plurality of spaced lights 118 forming the array. The light control 110 has a color setting (set) unit 114 and a color cancellation (cancel) unit 116.

The lighting system 100 may be entirely or partially mounted on a vehicle 200 (FIG. 2) or other location that has the light array 112. Thus, the electronic components of the lighting system 100 may be on a circuit board or other device mounted near or next to the light array 112, whether the light array is wirelessly coupled or wired to the light control 110 and/or other components. The light control 110 may be part of, or on, other electronic equipment or circuits on the vehicle and used for functions other than for operating the light array 112. Otherwise, any one or more components of the lighting system 100 may be remote from the light array 112 when the light array 112 is on a vehicle or other location, and where in that case, the remote units may commute over communications or computer networks, such as cellular, Internet, wide-world web, wide area, local area, personal area, or any other suitable data communication network. In various implementations, such communications networks may be satellite-based, and/or any number of other different types of wireless communications networks. By one example form, the data mentioned herein are transmitted using a 5G network.

Thus, by one example, at least the interface 106 may be on a mobile device such as a smartphone or tablet, although such mobile device may have more of the units as long as a power source 102 and light control 110 to set colors, activate lights, or deactivate lights on the light array 112 are at the location of the light array 112, such as on a vehicle. Otherwise, a cloud or other remote server or other computing device may have one or more units of the lighting system 100.

The light control 110 includes any combination of software, firmware, and hardware (including processor 108) used to operate the light array 112. The light control 110, and precisely software components thereof, may or may not be stored on the memory 104 and operated by the processor 108. The light control 110 also may include a computer bus (not shown) and receives data, such as base color selections, from the interface 106. In other examples, the light control 110 may be part of a larger control system that controls many systems, such as systems on a vehicle including an entertainment system, or vehicle lighting systems, such as for headlights, taillights, turning lights, interior cabin lights, door lights, instrument panel lights, dashboard displays, and so forth. Note the term dashboard is used herein in a general sense to include the displays or other components facing the driver and passenger including any instrument panel, display screen, glove compartment, HVAC vents, and so forth. In this case, the control of the lights may be coordinated with any of the sub-systems of the vehicle. For example, an entertainment system such as an audio system may be set to change the color of the lights 118 in synchronization with changes in output audio, as one example. Such synchronization may be used with any of the lighting sub-systems, or any vehicle system, as desired. It will be appreciated that the light control 110 may otherwise differ from the implementation depicted in FIG. 1.

In this example approach, the color setting unit 114 is provided to receive base color selections from a user via the interface 106, or may generate its own base colors, whether randomly, by predetermined light patterns (or color orders), or light patterns computed as needed or on the fly, as desired. Many variations are contemplated, and the present light control device is not particularly limited to such base light color generation methods.

The color cancel (or cancellation) unit 116 determines if instructions or signals are received to simultaneously emit one or more lights of one base color adjacent to one or more lights of a different base color. In this case, the color cancellation unit 116 determines adjustment colors to be emitted between the two base colors. The adjustment colors, in a format of expected values such as binary RGB values for one example, then may be provided to the color setting unit 114 to convert the data signals into electrical or data signals to control the lights 118 to emit the adjustment colors. The details for selecting the adjustment colors are provided below.

The light array 112 may have the lights 118 arranged in a linear light strip (as shown), any line of lights in any desired line shape, a matrix with rows and columns of lights, any combination of these, and/or any other desired irregularly shaped array, pattern, or arrangement where lights of the array near or adjacent each other can simultaneously emit multiple different base colors. Also, the lighting system 100 may have more than one light array 112, where the light arrays may or may not be controlled separately (e.g., unsynchronized).

By one form, each light 118 is an LED RGB (or other primary color) package with three LED diodes so that any desirable light perceived by a person can be emitted from a single light. When the lights 118 are simple electrical signal RGB LED packages, each of the red, green, and blue LEDs within the package may have its own anode and cathode connections. In this case, the color of the light emitted is controlled by adjusting the current or voltage supplied to each of the three LEDs. By varying the intensity of each LED, a wide range of colors can be achieved through the additive mixing of the primary colors. This type of RGB LED uses direct analog control to set colors, often using resistors, variable resistors, or pulse-width modulation (PWM) from the light control 110.

When the lights are data signal control RGB packages, the LEDs may be individually addressable LEDs, such as WS2812 or APA102 type of light arrays as random examples, and that incorporate a small control circuit within each LED package. These LEDs receive digital data signals to set color and brightness at the LEDs. The light control 110 may send a serial data stream that encodes the color values for the red, green, and blue channels, and optionally brightness values, for each LED. These LEDs use specific communication protocols, such as one-wire or two-wire interfaces for example, to transmit the data.

The lights 118 on the light array 112 may be covered by a light guide 120 formed of a transparent or translucent (semi-transparent or semi-opaque) or other diffuser material, such as acrylic, polycarbonate, and/or silicone.

At least one processor 108, which performs the computations and control functions of the light control 110, may have any type of processor circuitry forming one or more processors, processor cores, single integrated circuits such as a microprocessor(s), microcontroller(s), processors on systems on a chip (SoC), shared processors, specific function processors, or any suitable number of integrated circuit devices, processor circuitry, and/or circuit boards working in cooperation to accomplish the functions of a processing unit. Note that the processor 108 is referred to herein in the singular but includes at least one processor. During operation, the processor 108 executes one or more of the light cancellation or transition color generation tasks of light control 110. The processor 108 may or may not operate any one or more systems of a vehicle or other any device that has the lighting system 100. For example, the processor 108 may operate an entertainment system on a vehicle as well as a main vehicle lighting system, such as for headlights, tail lights, turning lights, interior cabin lights, door lights, and so forth, and any of these systems or sub-systems may be coordinated with operation of the lighting system 100 as mentioned above. As such, the processor 108 can control the general functions of the light control 110 as well as executes the processes at the vehicle described herein, such as portions of the processes and implementations depicted in FIGS. 3-9 and as described further below in connection therewith.

The memory 104 (including any storage) can be any type of suitable memory. For example, the memory 104 may include various types of volatile memory, various types of dynamic random access memory (DRAM) such as SDRAM, various types of static RAM (SRAM), cache, and the various types of non-volatile memory (PROM, EPROM, and flash). In certain examples, the memory 104 is located on and/or co-located on the same computer chip as the processor 108. In the depicted implementation, the memory 104 stores the software (programming or code) for the light control 110. The memory 104 also may include one or more databases to store data related to adjustment colors or even the color setting values for predetermined base color pairs for example, and as described herein, as well as any other data related to setting color for the lights 118 and as explained below with FIGS. 2-9.

The processor 108 and/or light control 110 may have one or more buses (not shown) as mentioned above to transmit programs, data, status and other information or signals between the various components of the lighting system 100 including with the light array 112. The bus can be any suitable physical or logical connection among computer systems and components. This includes, but is not limited to, direct hard-wired connections, fiber optics, infrared and wireless bus technologies.

The interface 106 may provide communication to and from the light control 110 to provide selections of base colors or color patterns form a user, for example. Whether the interface is on a remote device remote from a vehicle with the light control device, for example, or on a display screen within the vehicle with the lighting system 100, the interface may have an application (app) to display to the user to make the base color selections. Such selections are then wirelessly, or by wire, communicated to the light control 110. Such selections may be made on an interface 106 with a touch screen, keyboard, microphone and speech recognition system, stylus tool, or any other suitable input device.

It will be appreciated that while this example implementation is described in the context of a fully functioning computer system, the mechanisms of the present disclosure are capable of being distributed as a program product with one or more types of non-transitory computer-readable signal bearing media used to store the program and the instructions thereof and carry out the distribution thereof, such as a non-transitory computer readable medium bearing at least the code to operate the light control 110 and light color data, and including computer instructions stored therein for causing a computer processor (such as the processor 108) to perform and execute the program. Such a program product may take a variety of forms, and the present disclosure applies equally regardless of the particular type of computer-readable signal bearing media used to conduct the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain implementations. It will similarly be appreciated that the computer system of the light control 110 also may otherwise differ from the implementation depicted in FIG. 1, for example in that the computer system of the light control 110 may be coupled to or may otherwise use one or more remote computer systems and/or other control systems with processor 108.

The power source 102 may be one or more suitable power sources, whether portable and/or battery supplied, AC, DC, and so forth. The power source 102 of all of the units of lighting system 100 including the light array 112 may be the same shared power source. Otherwise, one power source 102 may be used for the certain units, such as the processor 108 and light control 110, while the light array 112 and interface 106 each may have a separate power source. A vehicle may have a number of different power source ports for the lighting system, whether temporary charge ports or something more permanent.

Figure 2:
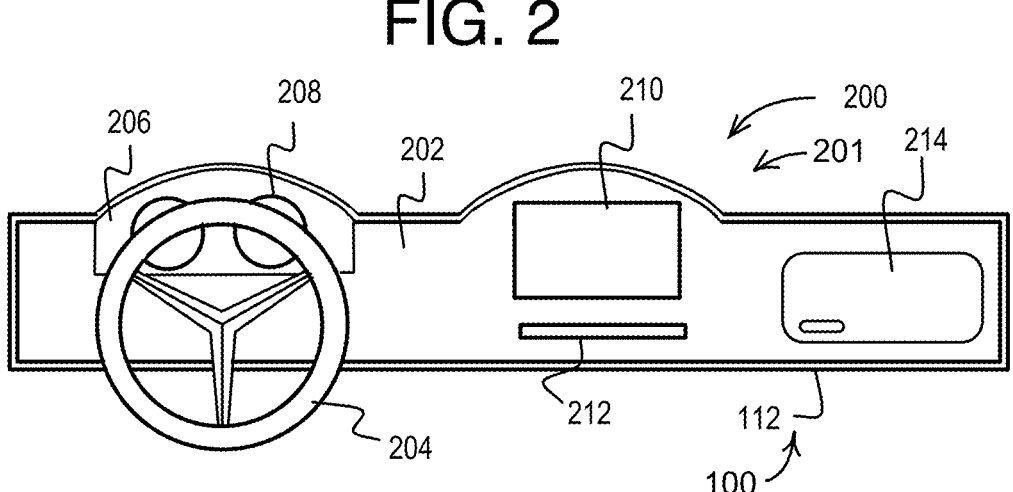
FIG. 2 is a schematic diagram of an example dashboard of an example vehicle with a lighting system according to at least one of the implementations herein.

Referring to FIG. 2, an example vehicle 200 has the lighting system 100 mounted on a body 201 of the vehicle. Many physical components and various details of the mechanical and electrical systems on the vehicle 200 are omitted to avoid obscuring the description of the lighting system 100, related methods, and systems herein. The body 201 is meant in a general sense to include any physical part of the vehicle 200.

In the illustrated example, the example vehicle 200 may have a dashboard 202 with a steering wheel 204, an instrument panel 206 with gauges 208, a display screen 210 with various functions including an audio entertainment system, a climate control panel 212, and a glove compartment 214. An example light array 112 is placed around the dashboard 202 for aesthetic effects. The light array 112 may be operatively coupled to the other data and signal handling units of lighting system 100 and may be located anywhere convenient or practical on or off of the vehicle as explained above. It will be appreciated that the light array 112 is shown in one example arrangement and may have many different arrangements on the vehicle 200 on many different parts of vehicle 200, whether on the interior or exterior (or both) of the vehicle 200. Thus, one or more light arrays 112 also may be on the doors, central console, seats, interior ceiling, steering wheel, etc. on the vehicle 200.

Figure 3:
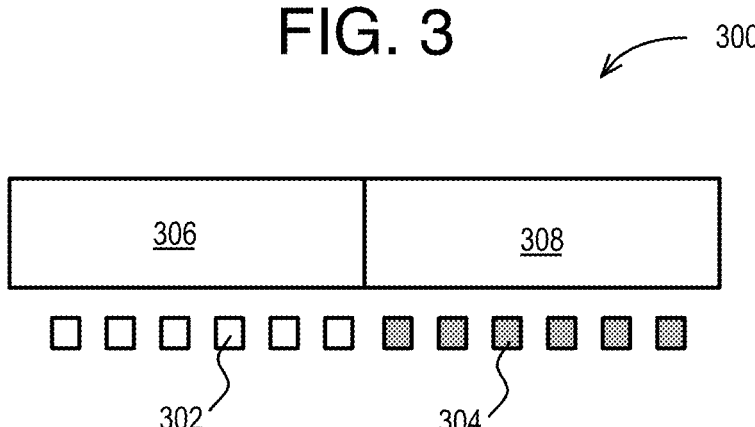
FIG. 3 is a schematic diagram of an example light array and resulting desired adjacent colors according to at least one of the implementations herein.

Referring to FIG. 3, a light array 300 has lights 302 generating a light emission 306 in one base color (say blue) and lights 304 generating a light emission 308 in a different base color (say red). The light array 300, here being in the form of a light strip, shows the desired light emissions where a user desires only these two colors adjacent each other, whether the colors were selected by the user or generated automatically by a light control device controlling the light array 300. The colors may be part of a rainbow type of arrangement along a long light strip array or other arrangement. When the light array 300 is an LED light array, the colors can be static or dynamic animations with colors changing and even appearing to move along or otherwise skip around locations within the light array.

Figure 4:
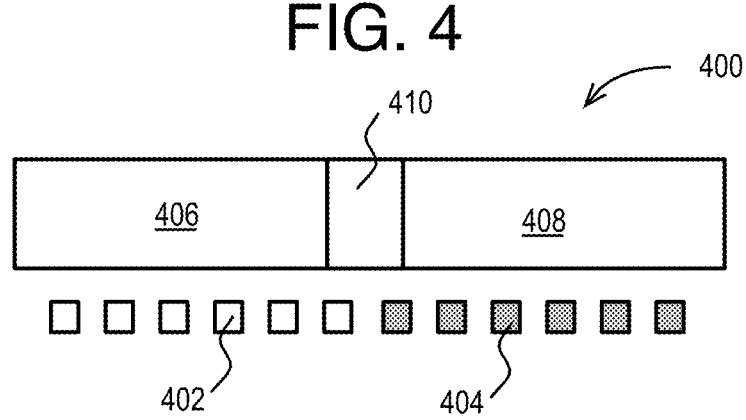
FIG. 4 is a schematic diagram of another example light array and a resulting mixed color between desired colors modified by at least one of the implementations herein.

Referring to FIG. 4, a light array 400 has lights 402 generating a light emission 406 in one base color (say blue) and lights 404 generating a light emission 408 in a different base color (say red). The light array 400, however, has color blending or mixing at a border between the two light groups where two lights 402 and 404 emitting different base colors are adjacent each other in the light array 400. This configuration results in a third undesired color or mixed color 410, such as magenta for a mix of blue and red base colors, and that defines a transition zone caused by light diffusion within a semi-opaque light guide covering the lights so that the base colors bleed together and form the mixed color 410. The mixed color 410 is an unwanted, unplanned mixed color different than the two base colors 406 and 408 being displayed that can be unaesthetic and distracting to a user viewing the light array 400 such that the mixed color appears out of place or interfering with a desirable emitted light pattern, thereby reducing the quality of the user experience viewing the emitted colors.

Figure 5:
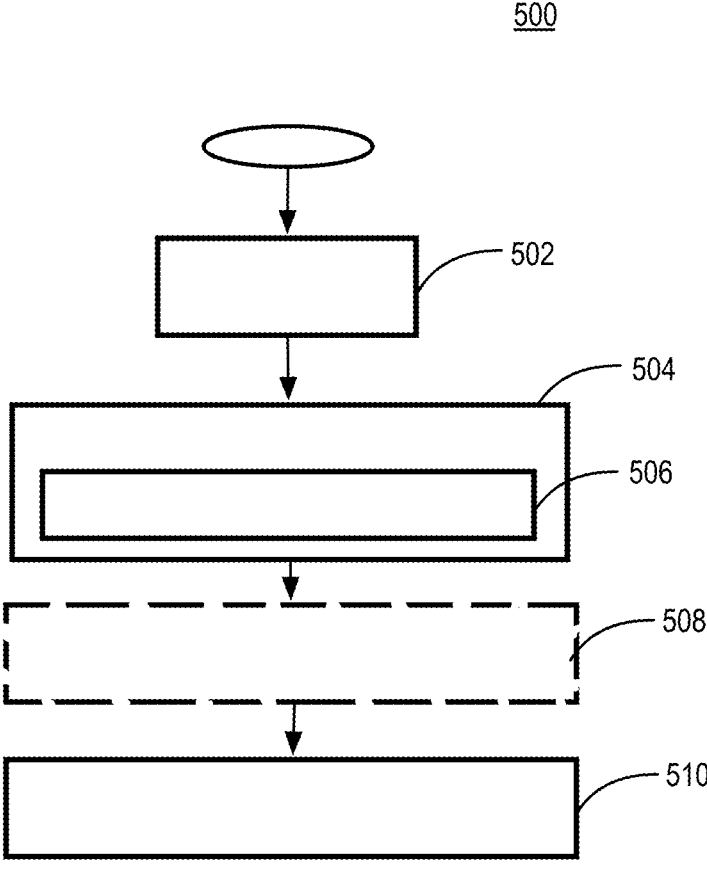
FIG. 5 is a flow chart of a method of operating a lighting system according to at least one of the implementations herein.

Referring to FIG. 5, an example process 500 of color cancellation for a lighting system is provided in accordance with various implementations herein. Process 500 includes operations 502 to 510, generally numbered evenly, and refers to the systems and sub-components thereof from any of FIGS. 1-4 and 6-9, where relevant.

In order to reduce or eliminate (or in other words, cancel) the appearance of the undesired third mixed color, the present process 500 actively cancels the mixed color by having lights at a border (or transition zone) between lights emitting adjacent base colors intentionally emit adjustment colors (or "opposing" colors). The emission of the adjustment color results in color blending at the transition zone that forms (or ultimately results in) emitted transition colors and a target color that are less noticeable (or less disturbing or less distracting) to a person than the undesired mixed color to create a smoother, more harmonious, or more natural fade appearance between the two base colors.

To generate the transition colors, an adjustment color is determined mathematically that yields a transition to a target color. The target color is predetermined and can be white as one example. The target color has a hue in between two base colors in at least one dimension (x or y) of a chromaticity (or color space) chart. The position of the mixed color relative to the target color on the color space chart is then used to select the adjustment color. The adjustment color can then be emitted to generate transition colors at and/or closer to the target color in hue than to the mixed color. In other words, the resulting transition colors have less differences in hue to the target color and base colors than a difference in hue between the mixed color and either of the base colors (or the average of the differences for the two base colors). This creates the smooth fade appearance, with a greater granularity or resolution, along a light array and in a transitioning order: from one base color, to a first transition color, to the target color, to a second transition color, and then the second base color. The details are provided as follows.

Process 500 may include "obtain at least two base colors" 502. As a preliminary matter, the lights that can be used for process 500 may be those of light array 112 (FIG. 1) with lights 118 that are each an RGB LED package and that each provide a range of perceivable colors, although many other types of lights can be used. At a minimum, process 500 may apply to a light array with three lights, including two lights for base colors, and one light for a single transition color, which can be the target color. Process 500, however, is mainly discussed below with a transition zone having two transition colors, and a target color between the two transition colors. Many other variations can be generated as well.

Figure 6:
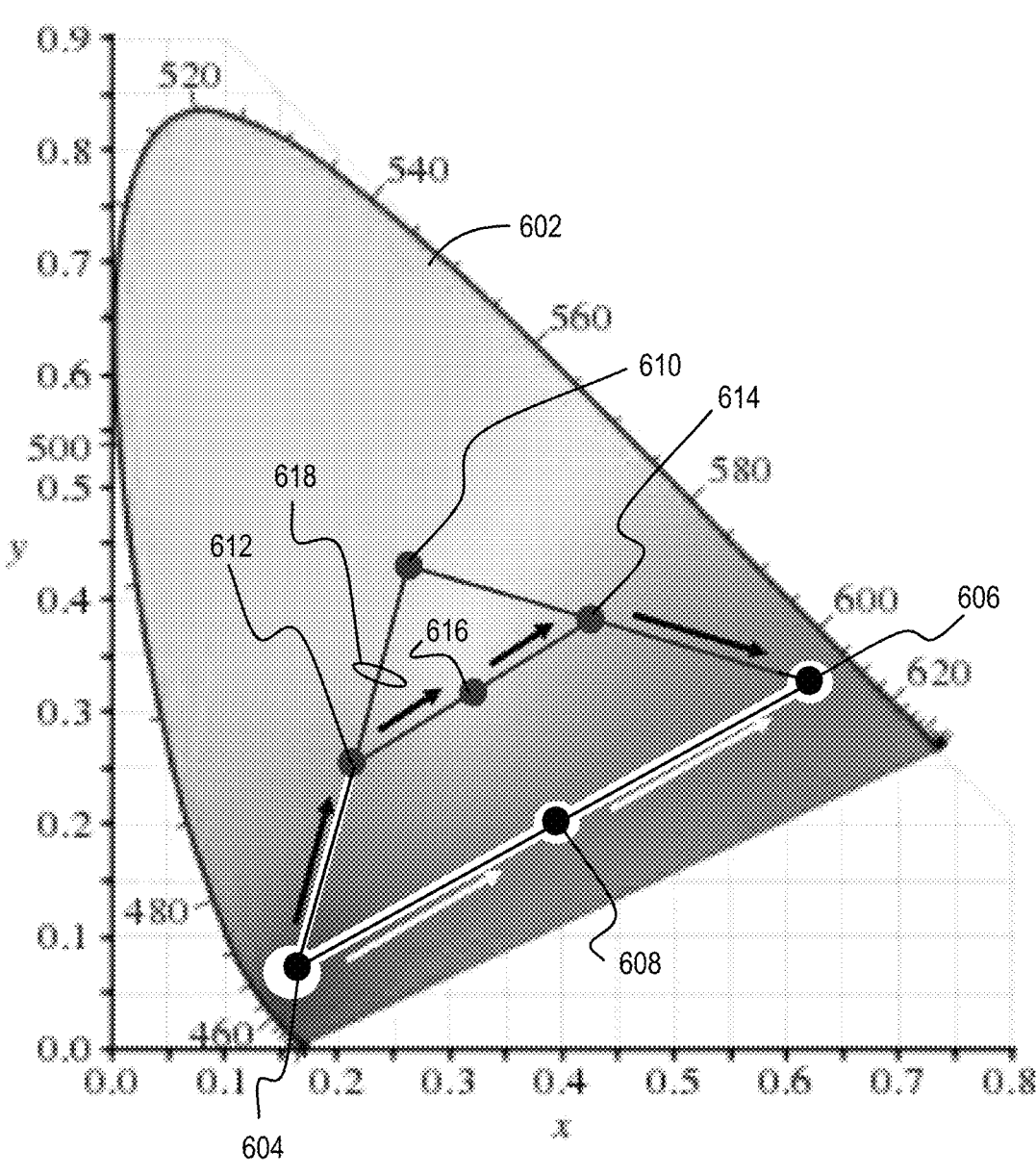
FIG. 6 is a graph of a color space showing colors used to generate a less perceivable mixed color according to at least one of the implementations herein.

Referring to FIG. 6, a color space chart 600 by one example is a CIE 1931 Chromaticity chart, which is a graphical representation of perceivable colors based on human vision, although other color spaces can be used instead. The color space chart 600 is plotted in x and y values that are based on the XYZ tristimulus values and where each point on the chart represents a specific hue saturation, independent of brightness. Also on chart 600, a line between any point on the chart and a point defining white has the same hue but with lower saturation as the point is moved along the line closer to white. Thus, the farther away from the outer border of the chart 600 and more toward white, the less saturated the specific color point on the chart. Any line with a different angle from white has a different hue. The numbers 460 to 620 are the wavelengths of the colors.

In this example, a blue base color 604 on chart 600 is to be emitted adjacent to a red base color 606, where color mixing of red and blue can occur along the line between the two base colors 604 and 606 as shown by the yellow (or white) arrows. When mixing of equal brightness of red and blue, an undesired mixed color 608, here magenta for a combination of blue and red base colors, can be formed in a transition zone of a light array 112. The magenta mixed color 608 between blue 604 and red 606 is found to be distracting and lowers the quality of the light display.

Thus, process 500 may include "set adjustment color" 504, and here adjustment color 610 on the chart 600. This forms a triangle with the base colors 604 and 606, where the sides of the triangle will form the transition colors as explained below. This operation "set adjustment color" 504, however, first includes "use predetermined target color" 506. Specifically, a target color 616 is predetermined and is selected to have at least one of the dimensions of the (x, y) coordinates to be between the x or y values of the two base colors. By one form, white is used as the target color 616 whenever white satisfies the coordinate criterion. The precise definition of white to be used may be one of several different white values, such as D65 (daylight) illuminant for example. For a general example, blue may have an x=0.15, white (D65) may have an x=.31, and red may have an x of 0.64 to satisfy the coordinate criterion. Alternatively, other target colors could be used as desired, and whether or not the coordinate criteria is used.

The adjustment color 610 is selected to cancel the mixed color 608 and result in the target color in the middle (assuming the same intensity) between the adjustment and mixed colors. Thus, one way to set the adjustment color is to find the difference between the mixed color and target color, and then double the difference in both magnitude and direction along or substantially the same linear line from mixed color to target color (shown in dashed line on FIG. 5A). In this case, the adjustment color has the same or substantially the same distance from the target color compared to the mixed color. By one form, the adjustment color 610 is considered to be sufficiently saturated to "pull" the line between the two base colors 604 and 606 towards the target color 616 on the chart 600 to establish the transition colors.

As shown, the result of then emitting the adjustment color 610 between the base colors 604 and 606 is an emission of light showing a transition along the light array and from base color 604 (blue) to a transition zone with a first transition color 612 (cyan), the target color 616 (here being white), and a second transition color 614 (light orange), and then to the second base color 606 (red) as shown by the black arrows on chart 600. The transition colors 612 and 614 are closer to the target color 616 and the base colors (in hue) than the difference in color (hue) between either of the base colors 604 or 606 and the unwanted mixed color 608 (magenta). The transition colors 612 and 614 respectively may be at the midpoint of the lines between the adjustment color 610 and the base colors 604 or 606, assuming equal intensity. By one form, the transition colors 612 and 614 are respectively considered a variation of the base colors rather than a separate color (or color family).

Figure 5A:
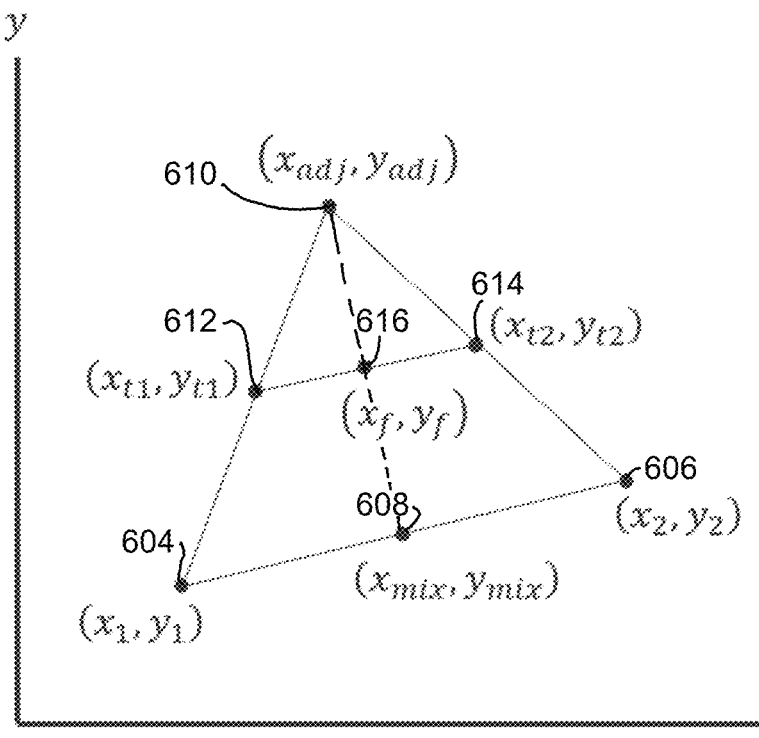
FIG. 5A is a graph showing color locations for a color space to be used to compute adjustment colors according to at least one of the implementations herein.

Referring to FIG. 5A, the triangle 618 from chart 600 is copied onto a graph to show one example computation used to obtain the adjustment color 610. The colors involved are in (x, y) chart coordinates as follows:

Base colors 604 and 606 respectively, $(x_1, y_1)$ and $(x_2, y_2)$,
Undesired mixed color 608, $(x_{mix}, y_{mix})$,
Adjustment Color 610, $(x_{adj}, y_{adj})$,
Target color (or final center transition color) 616, $(x_f, y_f)$,
Transition color 612 $(x_{t1}, y_{t1})$ from base color 604 to adjustment color 610,
Transition color 614 $(x_{t2}, y_{t2})$ from base color 606 to adjustment color 610,
Determining the adjustment color 610 can be stated as: given base colors 604 $(x_1, y_1)$, and 606 $(x_2, y_2)$, and target color 616 $(x_f, y_f)$, determine $(x_{adj}, y_{adj})$. It is assumed, for this example, all points have equal intensity and the mixed color 608 is the midpoint between base colors 604 and 606. The chart coordinates of the mixed color 608 (and in turn the mixed color itself) is then computed from the base color 604 and 606 as follows:

$$x_{mix} = \frac{x_1 + x_2}{2} \tag{1}$$

$$y_{mix} = \frac{y_1 + y_2}{2} \tag{2}$$

With the target color 616 $(x_f, y_f)$ being known, the x- and y-distance from the mixed color 608 to the target color 616 can be calculated as follows:

$$\Delta x_{f,mix} = x_f - x_{mix} \tag{3}$$

$$\Delta y_{f,mix} = y_f - y_{mix} \tag{4}$$

With the adjustment color's intensity equal to the base colors' intensities, the target color 616 will be the midpoint between the adjustment color 610 and mixed color 608. The distances between the mixed color 608 and target color 616 can be added to the coordinates of the target color 616 to determine the adjustment color (and its coordinates), as follows:

$$x_{adj} = x_f + \Delta x_{f,mix} \tag{5}$$

$$y_{adj} = y_f + \Delta y_{f,mix} \tag{6}$$

Optionally, process 500 may include "determine transition colors" 508. Thus, while the computation of transition colors is not necessary for operating the light array as described herein, it may be performed for other reasons. Again, assuming equal intensities for all points, the midpoint between the adjustment color 610 and each base color 604 or 606 can now be found and respectively set as the transition color 612 or 614 that will be emitted from the light array (or in other words, out of the diffusing light guide 120) after the adjustment color is emitted from the lights 118 (FIG. 1) and blends with the base colors 604 and 606. Thus, the transition color coordinates can be computed as follows.

$$x_{t1} = \frac{x_1 + x_{adj}}{2} \quad (7)$$

$$y_{t1} = \frac{y_1 + y_{adj}}{2} \quad (8)$$

$$x_{t2} = \frac{x_2 + x_{adj}}{2} \quad (9)$$

$$y_{t2} = \frac{y_2 + y_{adj}}{2} \quad (10)$$

With the above process, the adjustment color ($x_{adj}$, $y_{adj}$) is obtained and can be provided to the color setting unit of the light control to cancel the mixed color. It will be appreciated that more than one adjustment color may be used to create a variety of transition colors within the transition zone that is more than two transition colors plus the target color.

Process 500 may include "control lights to emit adjustment color at one or more border lights" 510. Thus, the one or more lights at the transition zone between base color lights are set to emit the adjustment color.

Figure 7:
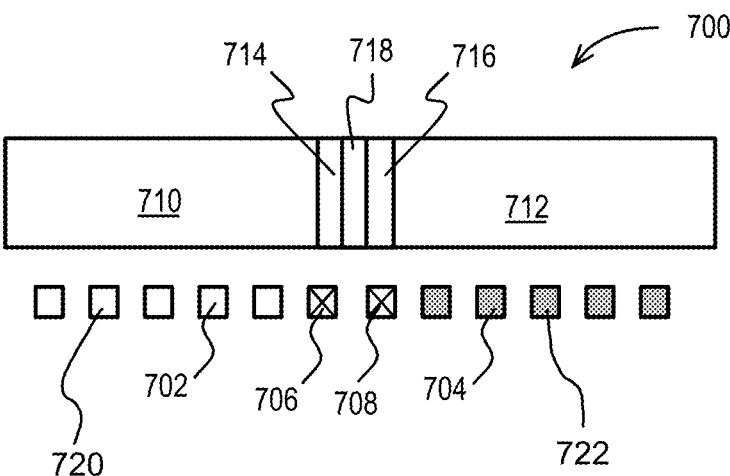
FIG. 7 is a schematic diagram of an example light array with less perceivable undesired mixed colors at a transition zone between two desired colors according to at least one of the implementations herein.

Referring to FIG. 7 for example, a light array 700 shows light emission using the methods disclosed herein and that has a first group 720 of lights 702 emitting one base color 710, such as blue, and a second group 722 of lights 704 emitting another base color 712 such as red. Two transition lights 706 and 708 are emitting an adjustment color that blends with the base colors 710 and 712 to thereafter create and emit transition colors 714 and 716 as described above with process 500. Thus, a green adjustment color emitted from transition lights 706 and 708 mixes within a light guide and with blue base color 710 from base lights 702 to form a cyan transition color 714. Likewise, the green adjustment color emitted from transition lights 706 and 708 mixes within a light guide and with red base color 712 from base lights 704 to form a light orange transition color 716.

Any undesired mixed color remaining from the blending of red and blue will be mixed with the adjustment color and the transition colors 714 and 716 to result in a perceivable target color 718, or here white light, between the transition colors 714 and 716. This arrangement eliminates, or at least reduces, the perception of the mixed color magenta.

This arrangement results in a light spectrum of desired or selected colors that has a more natural fade (e.g., more harmonious) of perceived colors thereby reducing or eliminating unwanted, previously unavoidable, distracting mixed colors in lightguides along the light array. In some forms, the transition zones resulting from the use of the color cancelling methods described herein will be largely imperceivable so that the light array will appear to emit just the two distinct adjacent base colors. This provides the observer with a more uniform appearance, and results in a more natural transition between colors. This process applies to both static color displays (two or more colors existing simultaneously) and dynamic displays (two or more colors changing color or intensity values). By changing the inputs to the equations of the color cancellation process, such as the adjustment color, the number of adjustment colors, number of LEDs (or lights) in the system, and so forth, the resulting transition zone can appear in a predictable, controlled, and more desired manner. Once the color cancellation system is set, the computations herein also avoid delays that can be caused by trial and error processes to determine an adjustment color.

In addition, the color cancellation process and light array using the color cancellation process herein may have several variations that can be determined by experimentation. For example, the number of transition zones and adjustment colors in each zone can be varied, with the more adjustment colors in a single zone, the more transition colors, and the smoother the transition from base color to base color. Also, depending on the application being used and the light density of the light array, multiple lights may be used to increase the transition zone width as desired. The greater the number of lights in the transition zone, the more adjustment colors that can be used, thereby providing even more granularity and smoothness of similar hued colors in the transition. The effects of the color cancelling also depends on the intensity (brightness) of the transition light, as well as the number and intensity of the non-transition or base lights. By one form, the adjustment colors have less intensity than the base colors.

Figure 8:
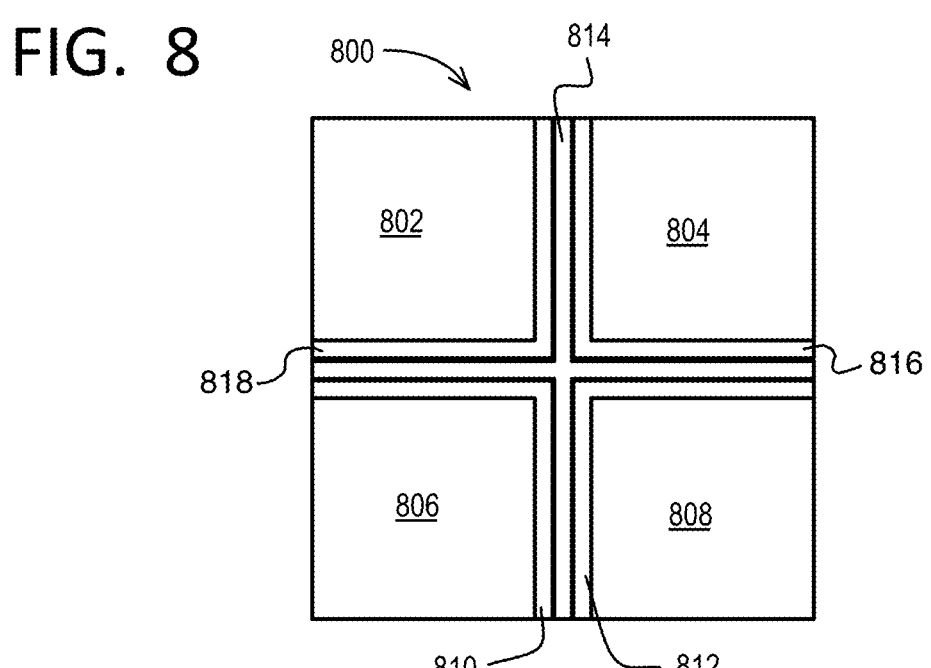
FIG. 8 is a schematic diagram of an example light pattern for a matrix lighting system and with more natural colors at transition zones between desired colors according to at least one of the implementations herein.
Figure 9:
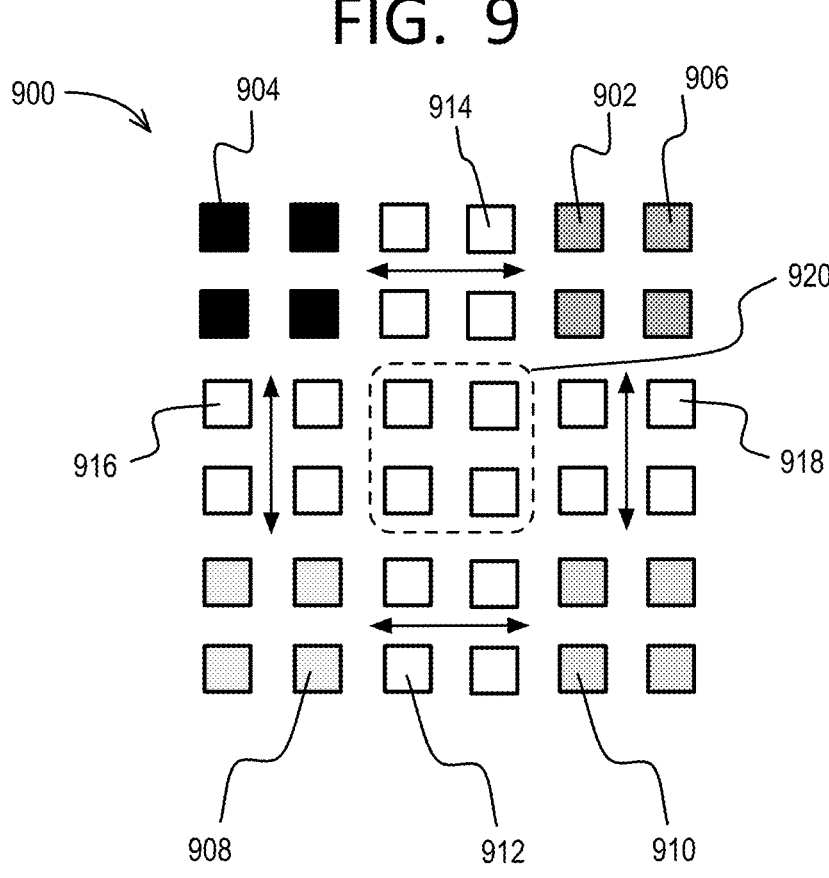
FIG. 9 is a schematic diagram of an example matrix lighting system used to form the light pattern of FIG. 8 according to at least one of the implementations herein.

Referring to FIGS. 8-9, an example light matrix array 900 (FIG. 9) emits example light pattern 800 (FIG. 8) using the light cancellation process described herein. The light matrix array 900 has a grid of 6×6 lights 902 (although many more or less lights could be used), each having adjustable color as with RGB LED packages described above for light array 112 (FIG. 1). A semi-opaque lightguide (not shown) may be placed over the lights. It may be desired to emit four different colors as four quadrants (here with four lights 902 in a square per quadrant). Thus, by this example, four lights 904 (shaded black) may be set to emit blue (802 on pattern 800), four lights 906 (shaded dark gray) may be set to emit red (804 on pattern 800), four lights 908 (shaded very light gray) may be set to emit magenta (806 on pattern 800), and four lights 910 (shaded light gray) may be set to emit green (808 on pattern 800).

This arrangement creates four transition zones 912, 914, 916, and 918 as shown along the sides of the light matrix array 900 where the transition direction is shown by the arrows. Each transition zone 912, 914, 916, and 918 has adjustment colors computed by using the processes described herein so that the transition zones 912, 914, 916, and 918 each have their own combination of transition colors. For example, transition colors 810 and 812, as well as a shared target color 814, is between colors magenta 806 and green 808. Each side of the pattern 800 has a different combination of the colors in its transition zone. A middle transition zone 920 may have adjustment values interpolated from all or any combination of the side transition zones 912, 914, 916, and 918. This results in each transition zone having a smoother more natural appearance with less unexpected or distracting colors. The target color 814 may be white in each transition zone 912, 914, 916, and 918. It will be understood that many variations in the arrangements for a matrix light array can be used.

By other alternatives, the arrangements herein can be extended to any RGB or color varying lighting application that emits multiple simultaneous colors and where a linear array or matrix array of lights of any shape is under a diffuser material of a lightguide.

While at least one example implementation has been presented in the foregoing detailed description, it should be appreciated that a vast number of variations exist. It should also be appreciated that the example implementations are not intended to limit the scope, applicability, or configuration of the disclosure in any way. Rather, the foregoing detailed description will provide those skilled in the art with a convenient road map for implementing the example implementations. It should be understood that various changes can be made in the function and arrangement of elements without departing from the scope of the disclosure as set forth in the appended claims and the legal equivalents thereof.

What is claimed is:

1. A method, comprising:
   receiving data indicating at least two different base colors to be respectively emitted from base lights on opposite sides of at least one transition light of a light array, wherein each light of the light array has adjustable colors and is covered by one or more light guides;
   receiving data of a target color between the two base colors in at least one coordinate dimension on a chromaticity color space chart, wherein the two base colors have an undesired mixed color on a linear line between the two base colors on the color space chart;
   determining, by at least one processor, at least one adjustment color on an opposite side of the target color from the mixed color on the color space chart; and
   providing the at least one adjustment color to be emitted from the at least one transition light when the base colors are being respectively and simultaneously emitted from the base lights on opposite sides of the at least one transition light.

2. The method of claim 1, wherein the lights of the light array are arranged in a linear array or a matrix array, and wherein individual lights of the light array are each color-adjustable LED packages with three diodes of three different colors.

3. The method of claim 1, comprising selecting the adjustable color so that emitting the adjustable color results in a transition zone between the two base colors with at least one perceivable transition color on opposite sides of the target color visible between the transition colors.

4. The method of claim 3, wherein the target color is white.

5. The method of claim 3, wherein the target color is selected so that the transition colors have less saturation than the base colors.

6. The method of claim 3, wherein the transition colors comprise a first transition color and a second transition color each respectively closer in hue to the first and second base colors and the target color than a difference in hue between each of the base colors and the mixed color.

7. The method of claim 1, wherein determining the adjustment color comprises selecting a color value of the adjustment color that is substantially on a same linear line from the mixed color to the target color.

8. The method of claim 1, wherein determining the adjustment color comprises selecting a color value of the adjustment color that is substantially an equal and opposite distance from the target color than the mixed color.

9. The method of claim 1, wherein determining the adjustment color comprises setting the target color along a line from the mixed color to the adjustment color.

10. The method of claim 9, wherein the target color is set to be at a midpoint of the line from the mixed color to the adjustment color.

11. A lighting system, comprising:
   an array of lights under at least one light guide and wherein each light has an adjustable color;
   a light control communicatively coupled to the array to control the color of the lights; and

processor circuitry forming at least one processor communicatively coupled to the array and arranged to operate the light control by:
   receiving data indicating at least two different base colors to be respectively emitted from base lights on opposite sides of at least one transition light of the light array,
   receiving data of a target color between the two base colors in at least one coordinate dimension on a chromaticity color space chart, wherein the two base colors have an undesired mixed color on a line between the two base colors on the color space chart,
   determining at least one adjustment color on an opposite side of the target color from the mixed color on the color space chart, and
   providing the at least one adjustment color to be emitted from the at least one transition light when the base colors are being respectively and simultaneously emitted from the base lights on opposite sides of the at least one transition light.

12. The system of claim 11, wherein determining the at least one adjustment color comprises determining a distance and direction between the mixed color and the target color, and doubling the distance in the same direction.

13. The system of claim 11, wherein the adjustment color is more saturated than the target color.

14. The system of claim 11, wherein the light array is a two dimensional matrix of lights having multiple transition zones each with a target color and an adjustment color.

15. The system of claim 11, wherein the adjustment color is selected so that the light array emits transition colors having a hue closer to one of the base colors than a difference in hue between the mixed color and one of the base colors.

16. A vehicle, comprising:
   a body;
   an array of lights under a light guide and wherein individual lights of the array each have an adjustable color;
   memory; and
   processor circuitry forming at least one processor communicatively coupled to the memory and the array, the processor to operate by:
      receiving data indicating at least two different base colors to be respectively emitted from base lights on opposite sides of at least one transition light of the light array,
      receiving data of a target color between the two base colors in at least one coordinate dimension on a chromaticity color space chart, wherein the two base colors have an undesired mixed color on a line between the two base colors on the color space chart,
      determining at least one adjustment color on an opposite side of the target color from the mixed color on the color space chart, and
      providing the at least one adjustment color to be emitted from the at least one transition light when the base colors are being respectively and simultaneously emitted from the base lights on opposite sides of the at least one transition light.

17. The vehicle of claim 16, wherein the adjustment color is emitted by more than one transition light on the array.

18. The vehicle of claim 16, wherein determining the adjustment color comprises determining multiple adjustment colors each to cause a different transition color than the other adjustment colors.

19. The vehicle of claim 16, wherein emitting the adjustment color at the at least one transition light results in emitting at least two transition colors and the target color between the two transition colors.

20. The vehicle of claim 16, wherein the light array is mounted on a dashboard, interior side of one or more vehicle doors, steering wheel, instrument panel, center console, vehicle ceiling, or any single one or combination of these.

* * * * *